United States Patent Office 2,762,803
Patented Sept. 11, 1956

2,762,803

PREPARATION OF THIAMIN CHLORIDE HYDROCHLORIDE

Robert E. Carnahan, Groton, Conn., assignor to Chas. Pfizer & Co., Inc., Brooklyn, N. Y., a corporation of Delaware No Drawing. Application June 15, 1954,
Serial No. 436,988

3 Claims. (Cl. 260—256.6)

This invention is concerned with a method for the interconversion of thiamin salts. In particular, it is concerned with a method for converting thiamin bromide hydrobromide to thiamin chloride hydrochloride.

It is often necessary to interconvert a salt of thiamin to another salt of this vitamin for preparation of materials of use in food enrichment and vitamin therapy. In particular, it is frequently necessary to convert thiamin bromide hydrobromide, a form of the vitamin commonly produced in industrial synthetic methods, to thiamin chloride hydrochloride, which is a commonly accepted form of the vitamin used for food enrichment, for the preparation of pharmaceutical products and so forth.

Various methods have been used in the past for the interconversion of thiamin salts. In particular, reference is had to the use of silver chloride suspended in water for converting thiamin bromide hydrobromide to the chloride hydrochloride. This method has obvious disadvantages, involving the use of an expensive reagent and the possibility of contamination of the product with undesirable silver compounds. A second method that has been used to a certain extent is the interconversion of thiamin salts by means of ion exchange resins. Here again there are certain disadvantages in the method in that rather dilute solutions must be used and special apparatus and ion exchange resins are required.

It has now been found that thiamin bromide hydrobromide may be converted to the chloride hydrochloride by a relatively simple method involving contacting the former salt in aqueous solution in the presence of a water-immiscible organic solvent with chlorine. Chlorine reacts with the bromide hydrobromide to convert it to the chloride hydrochloride with the simultaneous formation of bromine. The bromine is preferentially extracted into the water-immiscible organic solvent and may then be separated from the aqueous solution of the chloride hydrochloride. Thiamin chloride hydrochloride may be recovered in excellent quality and yield from the aqueous solution thus prepared. Standard methods may be used for this recovery process.

In the operation of the present process the chlorine which serves to convert the bromide hydrobromide to the chloride hydrochloride may be supplied in the form of a solution in the chosen water-immiscible solvent or the chlorine may be added to the two-phase system consisting of the aqueous thiamin solution and the water-immiscible solvent in the form of chlorine gas. It is desirable to agitate the mixture during the reaction so that the process may be accomplished with the greatest ease.

A variety of water-immiscible solvents may be used for the operation of the present process. It is desirable that the solvent not react to any appreciable extent with chlorine or bromine under the conditions of the present process. When the reaction is conducted according to the present invention the bromine, not having reacted with the solvent may be practically completely recovered as may the solvent. This is accomplished, for instance, by fractional distillation. The bromine and solvent may be reused in the same or other processes. Among the solvents which are particularly useful for the present method are various hydrocarbons, particularly saturated aliphatic hydrocarbons, such as pentanes, hexanes, heptanes, and octanes, and, most particularly, halogenated lower aliphatic hydrocarbons (having up to about four carbons), such as chloroform, methylene chloride, methyl chloride, ethyl chloride, carbon tetrachloride, dichloroethane, and so forth. In general, a volume of solvent (or of a mixture of the solvents) is used which is approximately equal to that of the aqueous solution of thiamin salt. The aqueous solution of thiamin bromide hydrobromide used for operation of the process should be at least about one percent and preferably somewhat higher in concentration. Concentrations of ten percent by weight or higher may be used successfully. The mixture of aqueous solution and solvent may be cooled below room temperature, that is, between about 5° C. and 15° C. to assure maximum stability of the starting material and product. Higher temperatures may be used, that is, up to 50° C., but there is no advantage to such a process and, in fact, there may be some disadvantage due to the instability of the product or reactant. In general, sufficient chlorine should be added to the mixture in the form of a solution in the chosen water-immiscible solvent or in the form of gaseous chlorine to assure complete reaction of the bromide hydrobromide. The process is one which operates relatively rapidly and, in general, can be completed within a few hours.

After completion of the reaction described above, the solvent phase may be separated. This then contains the bromine formed as a by-product of the reaction and very little of the thiamin salt. If necessary, a second portion of the organic solvent may be utilized to remove small residual amounts of bromine left in the aqueous solution of the product. The aqueous solution of thiamin chloride hydrochloride may then be treated for the recovery of the vitamin salt; for instance, it may be concentrated under vacuum at an elevated temperature, preferably at a temperature not higher than about 90° C. The concentrate thus obtained may be treated with certain water-miscible organic solvents to cause the separation of thiamin chloride hydrochloride. Solvents in which the thiamin salts have little solubility are, of course, preferred. These include acetone, dioxine, methanol, and ethanol. The crystalline product may then be cooled or removed from solution by other methods and washed and dried. In general, excellent yields have been obtained by this method. These have often exceeded 90% and the quality of the thiamin chloride hydrochloride produced is excellent, if a good quality bromide hydrobromide is used as starting material.

The following examples are given by way of illustration only and are not to be considered as a limitation on the scope of this invention, which is to be limited only by the specific wording of the appended claims.

Example 1

Thiamin bromide hydrobromide weighing 10 grams was dissolved in 150 millliters of water. Two hundred milliliters of carbon tetrachloride were added to the mixture, and it was rapidly stirred. Chlorine gas was bubbled through the solution at a rapid rate while the mixture was cooled to maintain it at about 5° C. After one hour the addition of chlorine was stopped and the organic solvent phase containing the evolved bromine was separated. The aqueous solution was extracted twice with 50-millimeter portions of carbon tetrachloride and the aqueous solution of thiamin chloride hydrochloride was concentrated under vacuum at a temperature of 35° C. The aqueous concentrate having a volume of about 20 milliliters was treated was 100 milliliters of ethanol. The crystalline chloride hydrochloride was filtered, washed with a small volume of water and dried under vacuum. The crystalline compound was shown by physical constants to be thiamin chloride hydrochloride of high purity. The material was obtained in a yield of 90 percent.

*Example II*

The process described in Example I was repeated using methylene chloride as the water-immiscible organic solvent. Thiamin chloride hydrochloride was recovered from the aqueous solution prepared in this manner.

*Example III*

The process of Example I was repeated using chloroform as the organic solvent. Thiamin chloride hydrochloride was separated from the aqueous solution in excellent yield and quality.

*Example IV*

The process of Example I was repeated using a mixture of hexanes as the organic solvent. Crystalline thiamine chloride hydrochloride was recovered in high yield.

What is claimed is:

1. A process which consists of contacting thiamin bromide hydrobromide with chlorine in aqueous solution in the presence of a water-immiscible organic solvent which is substantially inert to bromine.

2. A process as claimed in claim 1 wherein an aqueous solution of thiamin bromide hydrobromide is agitated in the presence of a saturated lower aliphatic halogenated hydrocarbon solvent and chlorine gas is added to the mixture.

3. A process for the preparation of thiamin chloride hydrochloride which consists of agitating a two-phase system consisting of an aqueous solution of thiamin bromide hydrobromide and a water-immiscible lower aliphatic halogenated organic solvent, adding chlorine gas thereto until substantially all of the thiamin bromide hydrobromide has been converted to thiamin chloride hydrochloride, separating the organic phase, extracting the thiamin chloride hydrochloride aqueous solution with fresh organic solvent and recovering thiamin chloride hydrochloride from the aqueous solution thereof.

References Cited in the file of this patent

UNITED STATES PATENTS 2,678,312   Carnahan _____ May 11, 1954